(12) United States Patent      (10) Patent No.:    US 12,617,047 B1

Green et al.             (45) Date of Patent:      May 5, 2026

(54) WELDING SCREEN SYSTEMS

(71) Applicant: Everlinx LLC, Hurricane, UT (US)

(72) Inventors: Sharalyn Green, Saint George, UT (US); Brandan Green, Saint George, UT (US)

(73) Assignee: Everlinx LLC, Hurricane, UT (US)

( * ) Notice: Subject to any disclaimer, the term of this patent is extended or adjusted under 35 U.S.C. 154(b) by 0 days.

(21) Appl. No.: 19/532,777

(22) Filed: Feb. 6, 2026

Related U.S. Application Data

(63) Continuation of application No. 18/527,996, filed on Dec. 4, 2023.

(51) Int. Cl.
    B23K 37/006        (2025.01)
    H05B 45/10         (2020.01)

(52) U.S. Cl.
    CPC ........... B23K 37/006 (2013.01); H05B 45/10 (2020.01)

(58) Field of Classification Search
    CPC ............ B23Q 11/0891; B23Q 11/0816; B23K 9/322; B23K 9/323; B23K 37/006; B23K 9/321; F16P 1/06
    See application file for complete search history.

(56) References Cited

U.S. PATENT DOCUMENTS

2018/0353330 A1* 12/2018 Papp ..................... B23K 9/322

* cited by examiner

*Primary Examiner* — Robert G Bachner
(74) *Attorney, Agent, or Firm* — Miller IP; Devin Miller

(57) ABSTRACT

Described herein are examples of systems that include a welding machine and a welding screen assembly communicatively linked to the welding machine. The welding screen assembly may include an adjustable opacity dimming screen and a coupling component configured to detachably couple the adjustable opacity dimming screen to a handpiece of the welding machine, wherein the coupling component may enable adjustable positioning of the dimming screen in relation to the handpiece. The welding screen assembly may further include a light source positioned on a side of the assembly proximal to a weld site and a control system configured to adjust the opacity of the adjustable opacity dimming screen to block excessive light during welding.

20 Claims, 3 Drawing Sheets

WELDING SCREEN SYSTEMS

CROSS-REFERENCE TO RELATED APPLICATIONS

The present application is a continuation of U.S. Non-Provisional patent application Ser. No. 18/527,996 entitled "Welding Screen Systems", filed on Dec. 4, 2023. The entire contents of the above-listed application are hereby incorporated by reference for all purposes.

BACKGROUND

In the field of welding technology, the primary aim is to enhance safety, visibility, and the overall user experience during welding processes. Welding, a fundamental practice in various industries, involves fusing materials through intense heat. Traditional safety measures, such as protective eyewear like goggles or standalone welding stands, present inherent challenges. The specific field involves the application of welding technology, which is essential for joining materials through the application of intense heat.

BRIEF DESCRIPTION OF THE DRAWINGS

The present description will be understood more fully when viewed in conjunction with the accompanying drawings of various examples of welding screen systems. The description is not meant to limit the welding screen system to the specific examples. Rather, the specific examples depicted and described are provided for explanation and understanding of welding screen systems. Throughout the description the drawings may be referred to as drawings, figures, and/or FIGs.

DETAILED DESCRIPTION

A welding screen system as disclosed herein will become better understood through a review of the following detailed description in conjunction with the figures. The detailed description and figures provide merely examples of the various embodiments of welding screen systems. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

In conventional welding setups, a standard welding screen is typically fixed in position, offering limited flexibility for welders to adjust its location and viewing angle. This static configuration can result in suboptimal visibility during welding, as welders may struggle to align the screen for their preferred viewing angle. Additionally, traditional welding screens lack rapid responsiveness to changing light conditions, potentially exposing welders to intense light during the critical moments before the automatic darkening response kicks in.

The existing state of the art presents challenges for welders who require adaptability and swift adjustments in their welding screen setups. The fixed nature of traditional screens can hinder productivity and compromise safety by limiting the welder's ability to tailor the screen's position and angle according to the unique demands of each welding task. Furthermore, the delay in automatic darkening responsiveness exposes welders to potential risks associated with prolonged exposure to intense light.

Implementations of a novel welding screen assembly disclosed herein aim to address these challenges by introducing a versatile attachment mechanism. This mechanism allows the welding screen to be adjusted and securely attached along the handpiece of the welding machine, offering welders the flexibility to customize the screen's position based on their preferences and specific welding conditions. The disclosed assembly also features a rapid dimming response, ensuring that the screen darkens swiftly before the initiation of welding, thereby enhancing safety and preventing excessive exposure to intense light.

The disclosed embodiment of the welding screen assembly enhances the conventional welding setup by providing welders with an adjustable and rapidly responsive screen. This embodiment allows welders to optimize their viewing angles and improve safety during welding operations. The assembly's adaptability and quick dimming response contribute to increased efficiency and reduced risks associated with prolonged exposure to intense light and therefore address key challenges in the current state of the art.

Figure 1:
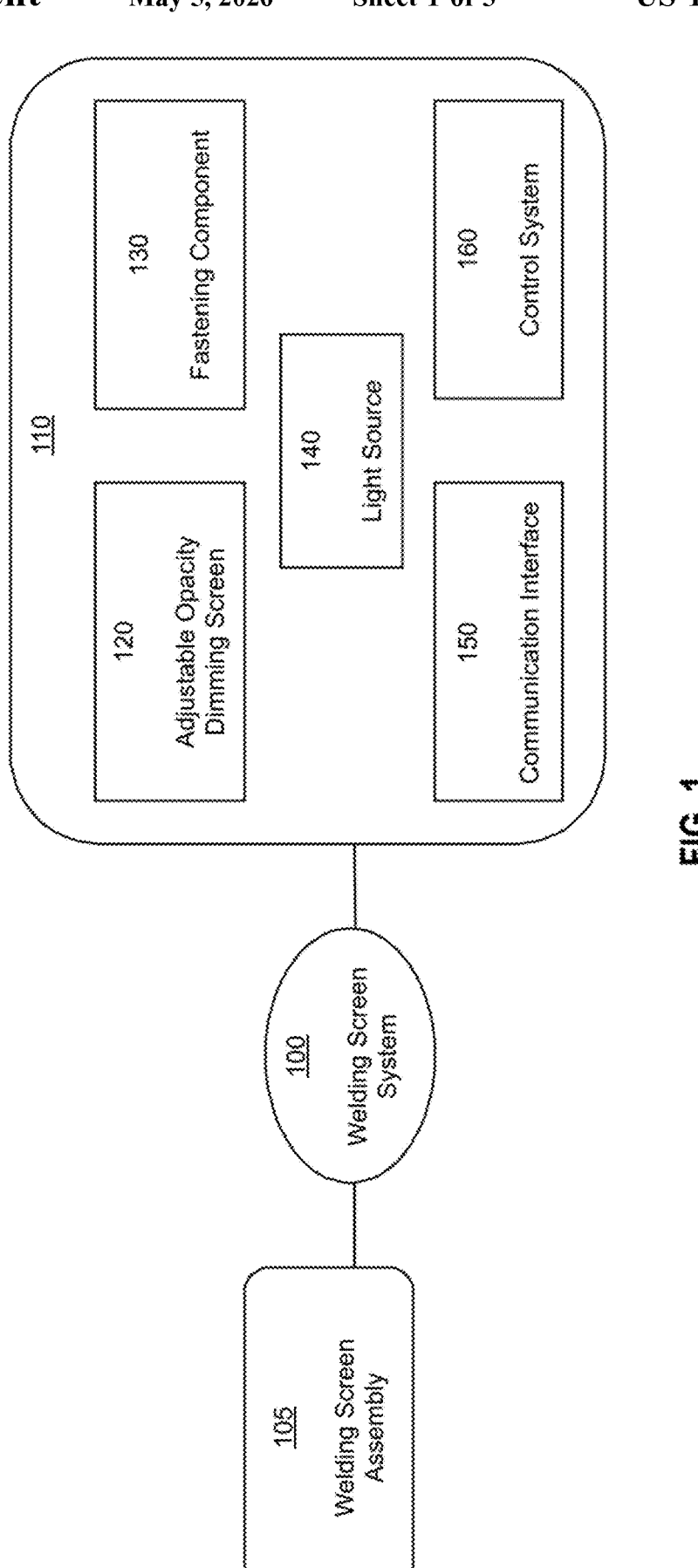
FIG. 1 depicts a block diagram of a welding screen system with a welding machine and a welding screen assembly, according to an embodiment.

FIG. 1 depicts a block diagram of a welding screen system 100 with a welding machine 105 and a welding screen assembly 110, according to an embodiment. The welding screen assembly 110 is adaptable to various welding applications, including but not limited to welding bracelets, necklaces, or chain links. According to various embodiments, the welding screen assembly 110 may include a variable tint screen ("dimming screen") 120, a fastening component 130, a light source 140, a communication interface 150, and/or a control system 160.

The communication interface 150 may be configured to communicatively link the welding screen assembly 110 to the welding machine 105. In one embodiment, the communication interface 150 may establish a wireless connection between the welding screen assembly 110 and the welding machine 105. In an alternative embodiment, the communication interface 150 may establish a wired connection between the welding screen assembly 110 and the welding machine 105. In another embodiment, the control system 160 may be configured to detect the success of the communication link between the welding screen assembly 110 and the welding machine 105. In the event of an unsuccessful connection, the control system 160 may be further configured to automatically initiate attempts to establish a wireless connection with the welding machine 105 by signaling the communication interface 150.

The welding screen assembly 110 may include a sensor (not shown) configured to detect variations in light intensity or specific wavelengths in the vicinity of the weld site. Upon sensing an impending welding process, the sensor may communicate with the control system 160. The control system 160 may be configured to adjust an opacity of the dimming screen 120 to optimize visibility and protection during welding. For example, when the sensor detects a sudden increase in intense light, characteristic of the bright arc light generated during welding, it signals the control system 160 to initiate the automatic darkening of the screen 120. This information is relayed to the control system 160, indicating the necessity and extent of darkness adjustment for the dimming screen 120. The control system 160 may execute predefined algorithms or utilize user-configured settings to analyze the received signal to determine the suitable darkness level required. Following this assessment, the control system 160 may send a control signal or command to the welding screen assembly components, including the dimming screen 120, instructing them to modulate the darkness to the desired level. In this way, the dimming screen 120 may adeptly adapt to the welding conditions and provide optimal protection against excessive light exposure during welding.

In some embodiments, the control system 160 may be further configured to illuminate the light source 140 before a welding operation and turn off the light source 140 immediately upon an initiation of the welding operation. Specifically, before the commencement of the welding operation, the control system 160 activates the light source 140, which may be used to illuminate the immediate work area, allowing the welder to accurately position materials, inspect the welding site, and make any necessary adjustments before initiating the welding process. To further optimize energy efficiency and prevent any interference during actual welding, the control system 160 may be configured to promptly deactivate or turn off the light source 140 as soon as the welding operation is initiated, the welding machine enters a standby mode, or the welding machine enters a wait mode. This immediate cessation of the light source 140 may assist a welder in transitioning from the preparatory phase to the welding process without unnecessary illumination. The controlled activation and deactivation of the light source 140 not only contribute to a more efficient workflow but also minimize potential distractions or glare during the critical moments of welding, thereby promoting a safer and more focused work environment for the welder.

In an alternative embodiment, instead of relying on the sensor, the welding machine 105, which may be communicatively linked to the welding screen assembly 110 via the communication interface 150, can send a signal to the welding screen assembly 110 in anticipation of the initiation of the welding process. Subsequently, the control system 160 within the welding screen assembly 110 may respond to this signal by darkening the dimming screen 120.

The control system 160 may be implemented in any suitable location within the welding screen assembly 110, and is therefore adaptable to various design configurations. For example, in an embodiment, the control system 160 may be integrated within the welding machine 105. In an alternative embodiment, the control system 160 may be integrated within the welding screen assembly 110. In yet another embodiment, the control system 160 may be implemented as a separate unit.

Figure 2:
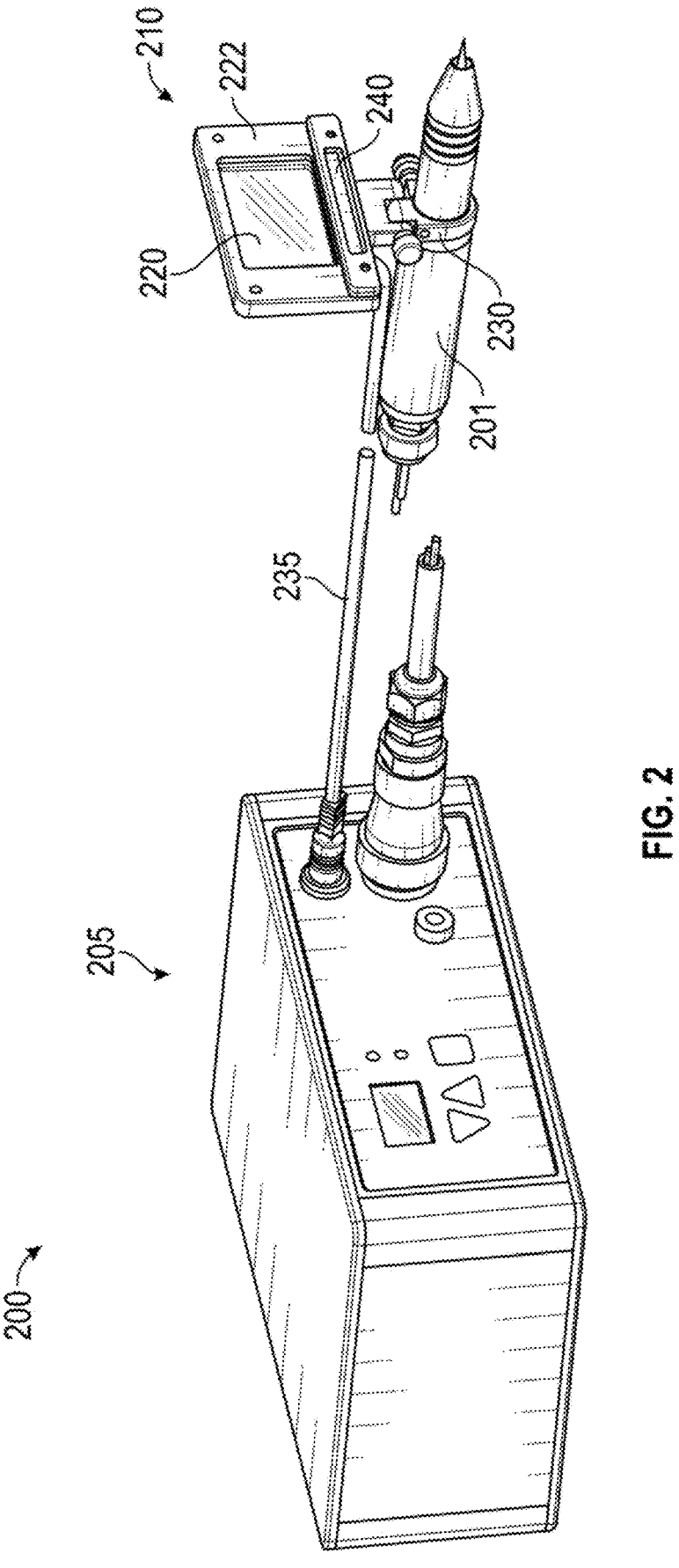
FIG. 2 illustrates a perspective view of a welding screen system with a welding machine and a welding screen assembly, according to an embodiment.

FIG. 2 illustrates a perspective view of a welding screen system 200 with a welding machine 205 and a welding screen assembly 210, according to an embodiment. The welding screen assembly 210 can be adjusted and securely attached along a welding tool or handpiece 201 of the welding machine 205. The handpiece 201 is a component that holds and controls the welding tool or torch during welding operations. The handpiece allows for precise control and maneuverability during a welding operation. The welding screen assembly 210 may provide enhanced ergonomic comfort and safety during welding by providing optimal viewing angles and protection against intense light emitted during welding. The welding screen assembly 210 may include a dimming screen 220, a fastening component 230, a light source 240, and a cable 235 connecting the dimming screen 220 to the welding machine 205 for enabling communication between the welding machine 205 and the dimming screen 220.

The dimming screen 220 may include any suitable material allowing it to transition rapidly from a transparent state to a darkened state in response to the initiation of a welding process. For example, the dimming screen 220 may include a photochromic material, electrochromic material, liquid crystal technology, or a light-reactive substances capable of swiftly adjusting an opacity of the screen in reaction to initiating the welding process. Specifically, the substance may be configured to adjust the darkness of the dimming screen 220 in reaction to initiating the welding process by altering its optical properties in response to changes in light conditions.

In one embodiment, the dimming screen 220 may be housed within a protective casing 222. The protective casing 222 may be attached to handpiece 201 of the welding machine 205. The protective casing 222 may be detachable and repositionable, allowing a user to selectively place the casing 222 and therefore the dimming screen 220 in a location most suitable along the handpiece 201 for the specific welding application. The protecting casing 222 is also capable of being removed when not needed.

The protective casing 222 may include any suitable shape and size to accommodate the dimming screen 220, so that the casing 222 does not obstruct the welder's view but is sufficiently large to provide protection for both the welder and the screen 220. The casing may include a rectangular, circular, oval, or polygonal-shaped body-shaped body and include a casing joint configured to connect to a clamp wrapped around or otherwise coupled to the handpiece 201. For instance, the protective casing 222 may be affixed to the handpiece 201 of the welding machine 205 using the fastening component 230, such as an O-ring clamp-style connector.

Figure 3:
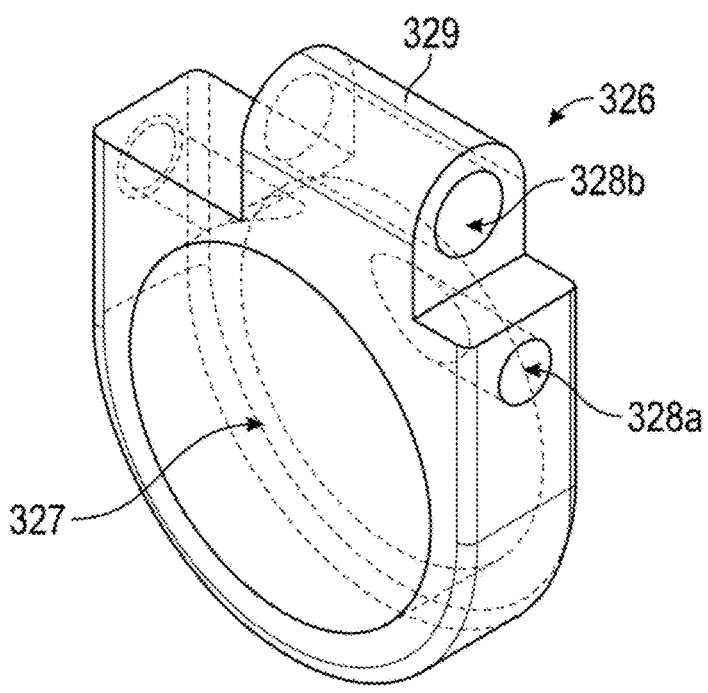
FIG. 3 illustrates a perspective view of coupling component for attaching a welding screen assembly to a handpiece of a welding machine, according to an embodiment.

FIG. 3 illustrates a perspective view of a coupling component for attaching a welding screen assembly to a handpiece of a welding machine, according to an embodiment. The depiction in FIG. 3 showcases an O-ring clamp-style connector 326 configured to provide a snug fit around the handpiece of the welding machine, thereby stabilizing a dimming screen (not shown) throughout welding. Specifically, the connector 326 may allow a user to customize the screen's orientation, aligning it with their preferred viewing angle for welding. The O-ring clamp-style connector 326 may include a half-elliptical-shaped body with an opening 327 for receiving a welding machine's handpiece therethrough. While the opening 327 is circular in this embodiment to match a handpiece with a circular cross-sectional shape, it can take various shapes. The connector 326 may include a first channel 328a configured to receive a first fastening element (shown in FIG. 4) therethrough. The first fastening element, when inserted through the first channel 328a, can be twisted to loosen or tighten the connector 326 around the handpiece. When the connector 326 is loosened, it enables a user to move the connector 326 and consequently the dimming screen attached thereto along the handpiece's length, allowing a user to move the dimming screen to a desired position along the handpiece for a particular welding application. Once the connector 326 is in the desired location, the first fastening element is inserted through the first channel 328a and twisted to tighten the connector 326 around the handpiece at the chosen position along the handpiece, thereby securely attaching the O-ring connector 326 to the handpiece.

Moreover, the O-ring clamp-style connector 326 may include a stem 329 configured to fit, engage or be coupled to a U-shaped fork (depicted in FIG. 4) attached to a casing of the welding screen assembly (not shown). The stem 329 may include a second channel 328b that aligns with two apertures on the fork, enabling the passage of a second fastening element therethrough (shown in FIG. 4). The second fastening element can be rotated through the second channel 328b and the apertures on the fork, allowing the fork and consequently the attached screen to pivot with respect to the handpiece. Once the desired angle is selected, the second fastening element can be twisted to tighten and thus securely attach the screen to the handpiece at the chosen angle. Accordingly, the O-ring clamp-style connector 326 and stem 329 may provide the user with flexibility to customize the dimming screen's orientation relative to the handpiece aligning it with their preferred viewing angle for welding.

The welding screen assembly can include various coupling components for attaching the protective casing or dimming screen to the handpiece. For instance, in one embodiment, the casing or dimming screen may include a threaded connection, securely attaching by screwing onto corresponding threads on the handpiece. In another embodiment, a snap-fit mechanism could facilitate tool-free attachment. Magnets may also be employed to couple the casing to the handpiece for swift coupling. In yet another embodiment, a bayonet mount could be incorporated, allowing secure attachment with a simple twisting motion. Furthermore, an alternative clamp and lock system, distinct from the one described above, could use a specialized clamp mechanism to securely fasten the casing. In yet another embodiment, the dimming screen may be directly connected to the handpiece of the welding machine, eliminating the necessity for the casing to be coupled to the handpiece. These coupling methods provide flexibility and adaptability, such that the protective casing meets the varied needs of different welding applications.

Figure 4:
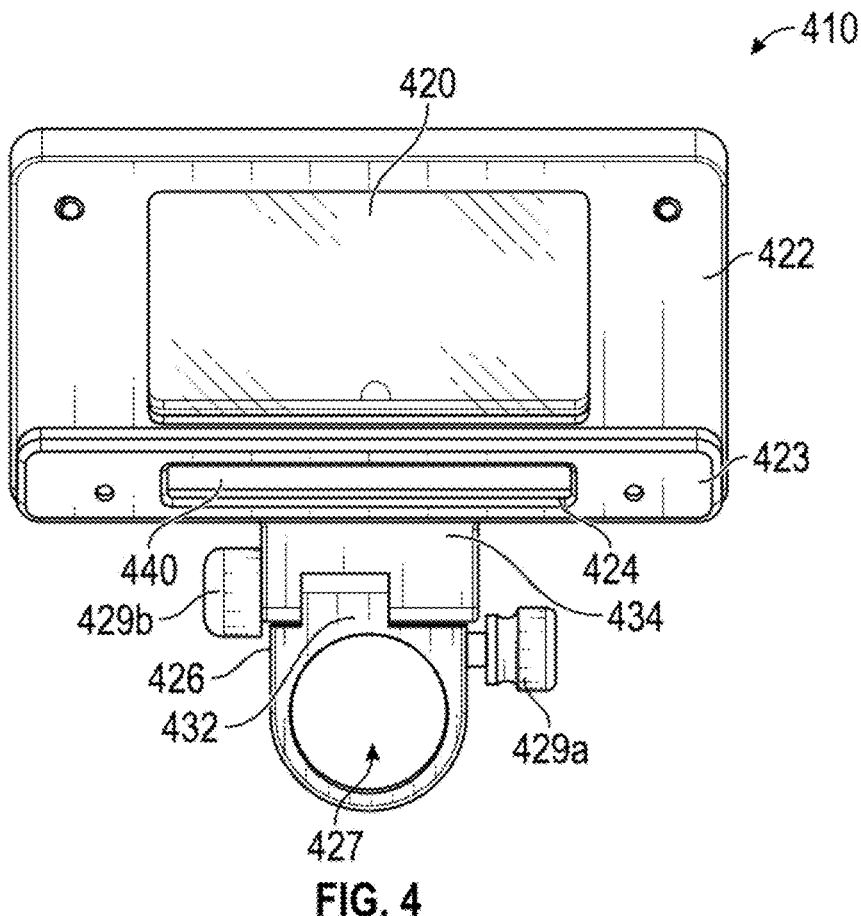
FIG. 4 illustrates a font view of a welding screen assembly, according to an embodiment.

FIG. 4 illustrates a front view of a protective casing 422 proximal to a weld site, of a dimming screen assembly 410, according to an embodiment. The casing 422 may include a bezel 423 extending outward away from the casing 422 and towards the weld site. This raised bezel 423 may be connected to the proximal side of the casing 422 via a fastener. In an alternative embodiment, the raised bezel 423 may be integrated into the proximal side of the casing 422. The bezel 423 may include a recess 424 configured to fit a light source 440 positioned within it. The light source 440 may be configured to fit within the recess 424 and, in one embodiment, may have a rectangular, elongated shape.

In the described embodiment, a rectangular, elongated shape light may provide certain advantages such as enhanced illumination coverage over a larger area for a more comprehensive and evenly distributed lighting effect. This configuration may be beneficial for welding tasks that require detailed precision, as the extended shape ensures that the entire work surface is well-lit and minimizes shadows and improves visibility. Additionally, the elongated light source may allow welders to focus illumination precisely where needed for optimal visibility during welding operations.

The elongated shape of the light 440 may enable a welder to tailor the lighting direction for their welding task by pivoting or orienting the elongated light source 440 to provide precise illumination at various angles and focal points. For instance, a swiveling or rotational component (not shown) can be inserted into the recess 424, pivotally coupling the light source 440 to the casing 422 within the recess 424. The elongated shape or size of the light enables a welder to customize the lighting direction according to the specifics of their work by pushing a side of the light inwards towards the recess. For example, pushing the right side of the light source 440 inwards may pivot the light to direct light to the left, and vice versa. The swiveling or rotational component may include a swivel mount, a pivot joint, or a ball-and-socket mechanism.

The subject technology, however, is not limited to the described rectangular, elongated shape for the light source 440 and allows for a range of shapes based on the specific requirements of different applications and the preferences of users. For example, circular lights may provide rounded illumination in all directions for comprehensive coverage, while square-shaped lights provide a compact and evenly distributed source of light. Triangular lights may provide various directional lighting options, catering to specific needs, and oval-shaped lights may combine wide coverage with focused illumination. Additionally, lights with multiple angles or adjustable segments may be utilized.

Additionally, FIG. 4 illustrates an O-ring clamp-style connector 426 configured to provide a snug fit around a handpiece of a welding machine (not shown), providing stability throughout welding and adaptability in positioning a dimming screen. The O-ring clamp-style connector 426 may include a half-elliptical-shaped body with an opening 427 for receiving the welding machine's handpiece therethrough. The connector 426 may include a first channel (not shown) configured to receive a first fastening element 429a therethrough. The first fastening element 429a, when inserted through the first channel, can be twisted to loosen or tighten the connector 426 around the handpiece. When the connector 426 is loosened, it enables a user to move the connector 426 and consequently a dimming screen 420 attached thereto along the handpiece's length, allowing the welding screen assembly 410 to move to a desired position along the handpiece for the particular welding application. Once the connector 426 is in the desired location, the first fastening element 429a is inserted through the first channel and twisted to tighten the connector 426 around the handpiece at the chosen position along the handpiece and thus securely attach the O-ring connector 426 to the handpiece.

Moreover, the O-ring clamp-style connector 426 may include a stem 432 configured to fit, engage or be coupled to a U-shaped fork 434 attached to the casing 422 of the welding screen assembly 410. The stem 432 may include a second channel (not shown) that aligns with two apertures on the fork 434, enabling the passage of a second fastening element 429b therethrough when the U-shaped fork 434 is jointly coupled to the stem 432. The second fastening element 429b can be rotated through the second channel and the apertures on the fork 434, allowing the fork 434 and consequently the attached dimming screen 420 to pivot with respect to the handpiece. Once the desired angle is selected, the second fastening element 429b can be twisted to secure the dimming screen 420 at the chosen angle. Accordingly, the O-ring clamp-style connector 426 and stem 432 may provide the user with the ability to customize the dimming screen's orientation relative to the handpiece aligning it with their preferred viewing angle for welding.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A system, comprising:
a welding machine comprising a handpiece configured to be used in a welding application, wherein the welding application comprises welding a bracelet, necklace, or chain link;
a welding screen assembly, comprising:
an adjustable opacity dimming screen housed within a protective casing, wherein:
the adjustable opacity dimming screen is configured to be attached to the handpiece;
the protective casing is detachable and repositionable along a length of the handpiece; and
the protective casing is configured to be selectively placed in a location most suitable for a specific welding application;
a light source comprising a light emitting diode ("LED") coupled to a side of the protective casing proximal to a weld site, wherein the LED is configured to:
turn on in response to the welding machine being in a ready mode; and
turn off in response to the welding machine being in a standby mode or a wait mode;
a cable connecting the adjustable opacity dimming screen to the welding machine;
a communication interface configured to establish a communication link between the welding screen assembly and the welding machine; and
a control system configured to adjust an opacity of the adjustable opacity dimming screen, wherein the adjustable opacity dimming screen transitions rapidly from a transparent state to a darkened state in response to an initiation of a welding process.

2. The system of claim 1, wherein the adjustable opacity dimming screen comprises a liquid crystal substance or light-reactive substance configured to adjust the opacity of the adjustable opacity dimming screen in reaction to initiating the welding process by altering an optical property of the substance in response to a change in light conditions surrounding the weld site.

3. The system of claim 1, further comprising a communication interface for communicatively linking the welding screen assembly to the welding machine to synchronize a darkening of the screen with the welding process.

4. The system of claim 2, wherein:
the welding screen assembly further comprises a sensor configured to detect a change in light intensity or a wavelength at the weld site; and
the sensor, in response to detecting a change in light intensity or wavelength at the weld site indicative of an imminent welding process, signals the control system to darken the adjustable opacity dimming screen.

5. The system of claim 1, wherein:
the LED is adjustable to provide variable illumination levels; and
the control system is further configured to automatically adjust an intensity of the LED based on ambient lighting surrounding the weld site.

6. The system of claim 1, wherein:
the LED is pivotally coupled to the protective casing; and
the LED is configured to pivot relative to the handpiece to provide precise illumination at an angle or focal point.

7. An assembly, comprising:
an adjustable opacity dimming screen housed within a protective casing;
a fastening component, wherein:
the fastening component is configured to couple the protective casing to a handpiece of a welding machine; and
the protective casing is configured to be adjustably positioned in relation to the handpiece according to a preferred position or viewing angle;
a light source positioned on a side of the protective casing proximal to a weld site;
a cable connecting the adjustable opacity dimming screen to the welding machine; and
a control system configured to adjust an opacity of the adjustable opacity dimming screen, wherein the adjustable opacity dimming screen darkens rapidly before an initiation of a welding process to block excessive light during welding.

8. The assembly of claim 7, wherein the adjustable opacity dimming screen comprises an electrochromic material configured to adjust the opacity of the adjustable opacity dimming screen by altering an optical property of the material in response to a change in light conditions surrounding the weld site.

9. The assembly of claim 7, wherein the protective casing comprises a rectangular, circular, oval, or polygonal-shaped body comprising a joint configured to connect to a clamp coupled to the handpiece of the welding machine.

10. The assembly of claim 7, wherein the adjustable opacity dimming screen is coupled directly to the handpiece of the welding machine.

11. The assembly of claim 7, wherein the control system is further configured to:
autonomously detect whether a communication link is established between the welding screen assembly and the welding machine; and
in response to the communication link not being established, automatically attempt to establish a wireless connection between the welding screen assembly and welding machine.

12. The assembly of claim 7, wherein:
the fastening component comprises an O-ring clamp-style connector comprising a half-elliptical-shaped body with an opening configured to fit the handpiece;
the O-ring clamp-style connector comprises a first channel configured to receive a first fastening element therethrough; and
the first fastening element is twisted to tighten or loosen the O-ring clamp-style connector around the handpiece.

13. The assembly of claim 12, wherein:
the O-ring clamp-style connector further comprises a stem coupled to the half-elliptical-shaped body; and
the stem comprises a second channel configured to receive a second fastening element therethrough.

14. The assembly of claim 13, wherein:
the protective casing comprises a U-shaped fork coupled thereto;
the U-shaped fork comprises an aperture configured to receive the second fastening element therethrough to jointly couple the U-shaped fork to the stem; and
the second fastening element is twisted to tighten or loosen the O-ring clamp-style connector, wherein the adjustable opacity dimming screen is configured to be rotatably adjusted relative to the handpiece.

15. A system, comprising:

a welding machine comprising a handpiece; and a welding screen assembly communicatively linked to the welding machine, wherein the welding screen assembly comprises:

an adjustable opacity dimming screen;

a coupling component configured to detachably couple the adjustable opacity dimming screen to the handpiece, wherein the adjustable opacity dimming screen is configured to be positionably adjustable relative to the handpiece;

a light source positioned on a side of the welding screen assembly proximal to a weld site; and a control system configured to adjust an opacity of the adjustable opacity dimming screen.

16. The system of claim 15, wherein the adjustable opacity dimming screen comprises a photochromic material configured to adjust the opacity of the adjustable opacity dimming screen in reaction to initiating a welding process by altering an optical property of the photochromic material in response to a change in light conditions surrounding the weld site.

17. The system of claim 16, wherein:

the welding machine is configured to send a signal to the control system before an initiation of the welding process; and in response to receiving the signal, the control system rapidly darkens the adjustable opacity dimming screen.

18. The system of claim 15, further comprising a communication interface configured to establish a wireless or wired connection between the adjustable opacity dimming screen and the welding machine.

19. The system of claim 15, wherein the adjustable opacity dimming screen is configured to:

move longitudinally along the handpiece according to a preferred position; or rotatably adjust its angle relative to the handpiece according to a preferred viewing angle.

20. The system of claim 15, wherein the control system is further configured to:

illuminate the light source before initiating a welding operation; and turn off the light source immediately upon initiating the welding operation.

\* \* \* \* \*